(12) United States Patent
Fujiwara et al.

(10) Patent No.: US 8,121,995 B2
(45) Date of Patent: Feb. 21, 2012

(54) SERVICE SEARCH SYSTEM, METHOD, AND PROGRAM

(75) Inventors: Kaori Fujiwara, Kanagawa-ken (JP); Toyotaro Suzumura, Tokyo (JP); Masayuki Ioki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 12/354,652

(22) Filed: Jan. 15, 2009

(65) Prior Publication Data
US 2009/0192997 A1 Jul. 30, 2009

(30) Foreign Application Priority Data
Jan. 25, 2008 (JP) ................................. 2008-15483

(51) Int. Cl.
*G06F 17/30* (2006.01)
(52) U.S. Cl. ........................................ 707/705; 707/802
(58) Field of Classification Search .................. 707/705, 707/736, 999.003, 802
See application file for complete search history.

(56) References Cited

U.S. PATENT DOCUMENTS

| | | | | |
|---|---|---|---|---|
| 5,577,166 A * | 11/1996 | Mizuno | ............................ | 706/20 |
| 7,043,473 B1 * | 5/2006 | Rassool et al. | ........................ | 1/1 |
| 7,124,062 B2 * | 10/2006 | Gebhart | ........................ | 702/186 |
| 2004/0230636 A1 * | 11/2004 | Masuoka et al. | ............... | 708/800 |
| 2005/0050026 A1 * | 3/2005 | Kawamura et al. | ............... | 707/3 |
| 2005/0187975 A1 * | 8/2005 | Yamane | ..................... | 707/104.1 |
| 2005/0235053 A1 * | 10/2005 | Sano | ............................ | 709/223 |
| 2006/0015843 A1 * | 1/2006 | Sabbouh | ........................ | 717/106 |
| 2006/0085664 A1 * | 4/2006 | Nakamura et al. | ................. | 714/1 |
| 2006/0101060 A1 * | 5/2006 | Li et al. | ........................ | 707/102 |
| 2007/0217515 A1 * | 9/2007 | Wang et al. | .............. | 375/240.17 |
| 2007/0244870 A1 * | 10/2007 | Laurent et al. | ..................... | 707/3 |
| 2007/0282879 A1 * | 12/2007 | Degenkolb et al. | ............ | 707/101 |
| 2008/0082524 A1 * | 4/2008 | Inaba et al. | ........................ | 707/5 |
| 2008/0120650 A1 * | 5/2008 | Orihara et al. | .................. | 725/45 |
| 2008/0215453 A1 * | 9/2008 | Yoshii | .............. | 705/26 |
| 2008/0243632 A1 * | 10/2008 | Kane et al. | ....... | 705/26 |
| 2008/0313190 A1 * | 12/2008 | Cheng et al. | .................... | 707/10 |

(Continued)

FOREIGN PATENT DOCUMENTS

| | | |
|---|---|---|
| JP | 2002-259607 | 9/2002 |
| JP | 2003-036270 | 2/2003 |

OTHER PUBLICATIONS

Dong et al., "Similarity Search for Web Services", Proceedings of the 30th VLDB Conference, Toronto, Canada 2004, pp. 372-383.*

*Primary Examiner* — Hung T Vy
*Assistant Examiner* — Phuong Thao Cao
(74) *Attorney, Agent, or Firm* — Shimokaji & Assoc., P.C.

(57) ABSTRACT

The invention provides a support system for searching for a function, including: a first storage for storing a history of at least one output parameter of each of a plurality of functions; an input section for receiving an input of an output parameter expected as an output of a function for a search; a calculating section for calculating first indexes respectively indicating proximity of the output parameter as inputted to each of those stored in the first storage, and summing the calculated first indexes for each function; and an output section for selecting, from among the plurality of functions, a function having a sum of the first indexes larger than a predetermined value, and outputting the selected function.

14 Claims, 13 Drawing Sheets

U.S. PATENT DOCUMENTS

| | | | |
|---|---|---|---|
| 2009/0063427 A1* | 3/2009 | Zuta et al. | 707/3 |
| 2009/0150384 A1* | 6/2009 | Kruger et al. | 707/5 |
| 2009/0164454 A1* | 6/2009 | Sanguinetti et al. | 707/5 |
| 2009/0259646 A1* | 10/2009 | Fujita et al. | 707/5 |
| 2010/0114939 A1* | 5/2010 | Schulman et al. | 707/769 |
| 2010/0229120 A1* | 9/2010 | Inoue et al. | 715/811 |

* cited by examiner

| SERVICE ID | SERVICE LOCATION |
|---|---|
| service1 | http://△△/service1 |
| service2 | http://△△/service2 |
| ⋮ | ⋮ |

*FIG. 2A*

| SERVICE ID | INPUT PARAMETER | OUTPUT PARAMETER | EXECUTION DATE |
|---|---|---|---|
| service1 | 100.0 | 10483.6932 | 2007/12/01 |
| service2 | 100.0 | 0.8708 | 2007/12/10 |
| ... | ... | ... | ... |
| service0101 | (23, 36, 15) | (23, 22) | 2007/12/01 |
| service0101 | (11, 15, 10) | (10, 12) | 2007/12/01 |
| service0102 | (15, 10) | (10, 12) | 2007/12/01 |
| ... | ... | ... | ... |

FIG. 2B

| SERVICE ID | INPUT PARAMETER | OUTPUT PARAMETER | EVALUATION RESULT | EVALUATION DATE |
|---|---|---|---|---|
| service1 | 120.0 | 10500 | CORRECT | 2007/12/01 |
| service1 | 110.0 | 0.9 | INCORRECT | 2007/12/10 |
| ... | ... | ... | ... | ... |

FIG. 2C

```
<?xml version="1.0" encoding="UTF-8"?>
<wsdl:definitions xmlns:tns="http://test/GetCurrency"
 xmlns:wsdl="http://schemas.xmlsoap.org/wsdl/" xmlns:xsd="http://www.w3.org/2001/XMLSchema"
 name="GetCurrency" targetNamespace="http://test/GetCurrency">
<!--DATA TYPE DEFINITION USED FOR DESCRIBING EXCHANGED MESSAGE-->
 <wsdl:types>
  <xsd:schema targetNamespace="http://test/GetCurrency" xmlns:tns="http://test/GetCurrency"
   xmlns:xsd="http://www.w3.org/2001/XMLSchema">
   <xsd:element name="getCurrency">
    <xsd:complexType>
     <xsd:sequence>
      <xsd:element name="JPY" nillable="true" type="xsd:double"/>         900A
     </xsd:sequence>
    </xsd:complexType>
   </xsd:element>
   <xsd:element name="getCurrencyResponse">
    <xsd:complexType>
     <xsd:sequence>
      <xsd:element name="USD" nillable="true" type="xsd:double"/>         900B
     </xsd:sequence>
    </xsd:complexType>
   </xsd:element>
  </xsd:schema>
 </wsdl:types>
<!--ABSTRACT DEFINITION OF CONVEYED DATA-->
 <wsdl:message name="getCurrencyRequestMsg">
  <wsdl:part element="tns:getCurrency" name="getCurrencyParameters"/>
 </wsdl:message>
 <wsdl:message name="getCurrencyResponseMsg">
  <wsdl:part element="tns:getCurrencyResponse" name="getCurrencyResult"/>
 </wsdl:message>
 <wsdl:portType name="GetCurrency">
  <wsdl:operation name="getCurrency">
   <wsdl:input message="tns:getCurrencyRequestMsg" name="getCurrencyRequest"/>
   <wsdl:output message="tns:getCurrencyResponseMsg" name="getCurrencyResponse"/>
  </wsdl:operation>
 </wsdl:portType>
</wsdl:definitions>
```

FIG. 9

```
<tModel xmlns="urn:uddi-org:api"
tModelKey="UUID:AAAAAAAA-AAAA-AAAA-AAAA-AAAAAAAAAAAA">
  <name>test:GetCurrencyUddi</name>
  <description xml:lang="en">
          Change Currency
  </description>
  <overviewDoc>
    <overviewURL> http://test/getcurrency.wsdl</overviewURL>
  </overviewDoc>
  <categoryBag>
    <keyedReference
      tModelKey="UUID:CD111111-1111-1111-1111-111111111111"
      keyName="Change currency"
      keyValue="xsd:double"/>
  </categoryBag>
</tModel>
```
—1200
—1210
—1220

```
<find_tModel generic="2.0" xmlns="urn:uddi-org:api_v2">
    <name>ChangeCurrencyPortType</name>
    <categoryBag>
        <keyedReference
          tModelKey=" UUID:CD111111-1111-1111-1111-111111111111 "
          keyValue="GetCurrency"/>
    </categoryBag>
</find_tModel>
```
—1230

FIG. 10

SERVICE SEARCH SYSTEM, METHOD, AND PROGRAM

BACKGROUND OF THE INVENTION

The present invention relates to a system, a method, and a program for searching for a service. In particular, the present invention relates to a system, a method, and a program for searching for a service based on the processing history.

Conventionally, components usable as part of software have been publicly accessible on communication networks such as the Internet, so that other software can call the components for execution. An example of such components is a web service. If software development is performed by combining such web services, the trouble and the cost involved in development/maintenance of software can be alleviated.

Techniques such as WSDL (Web Services Description Language), UDDI (Universal Description, Discovery and Integration), and Semantic Web are used to describe the specification of a web service. These techniques enable a creator or an administrator of a web service to accurately define the input/output interface of the web service or the like, and convey it to a user. The user, in turn, uses these specifications to automatically generate a subprogram for shaping the parameter format, such as Stab or Skelton.

For a search technique concerning text content, reference should be made to the following patent documents Nos. 1-2.

[Patent Document 1]
Japanese Patent Application Publication No. 2002-259607
[Patent Document 2]
Japanese Patent Application Publication No. 2003-36270

Representative specifications describable by the above mentioned technology such as WSDL are interface portions such as a data type, a transport, and a set of address of input/output parameters. A creator or an administrator of a web service can also write a summary of the web service by a natural language, as a comment or a description.

In many cases, the function of a web service can not be known before actual execution of the web service, even though the specification of the interface portion is known. For example, even though the input and the output are both known to be double precision floating point numbers, the function used in converting the input to the output is only known after the execution. Furthermore, comments written by a natural language are not necessarily accurate description, which makes it difficult to grasp the accurate operation of the web service from the comment.

Therefore conventional usage of web services have involved troublesome work that require human hand to actually execute numerous web services to find out an adequate web service based on the execution results. In view of this, it is an aspect of the innovations herein to provide a system, a method, and a program capable of solving the above-stated issues.

SUMMARY OF THE INVENTION

To solve the above-mentioned issues, a support system is provided for searching for a function, including: a first storage for storing a history of at least one output parameter of each of a plurality of functions; an input section for receiving an input of an output parameter expected as an output of a function for a search; a calculating section for calculating first indexes respectively indicating proximity of the output parameter as inputted to each of those stored in the first storage, and summing the calculated first indexes for each function; and an output section for selecting, from among the plurality of functions, a function having a sum of the first indexes larger than a predetermined value, and outputting the selected function. In addition, a method and a program to function a computer as the mentioned system are provided.

Additionally, a program product stored on a medium is provided, which causes a computer to function as a function search supporting system, where the computer includes a first storage that stores, in association with each of a plurality of functions, a history of at least one output parameter outputted from the function, the program causing the computer to function as: an input module for inputting thereto an output parameter expected as an output from a function for the search; a calculating section for calculating first indexes respectively indicating proximity of the inputted output parameter to each of those stored in the first storage, and summing calculated first indexes for each function; and an output section for selecting, from among the plurality of functions, a function having a sum of first indexes larger than a predetermined value, and outputting the selected function.

These and other features, aspects and advantages of this invention of the present invention will become better understood with reference to the following drawings, description, and claims.

BRIEF DESCRIPTION OF THE FIGURES

FIG. 2A shows one example of a data structure of a service according to the present embodiment;

FIG. 2B shows one example of a data structure of an execution history according to the present embodiment;

FIG. 2C shows one example of a data structure of an evaluation history according to the present embodiment;

FIG. 9 shows one example of WSDL data that corresponds to a service searched for in the present embodiment;

FIG. 10 shows one example of a tModel data and a search query corresponding to a service searched for in the present embodiment.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
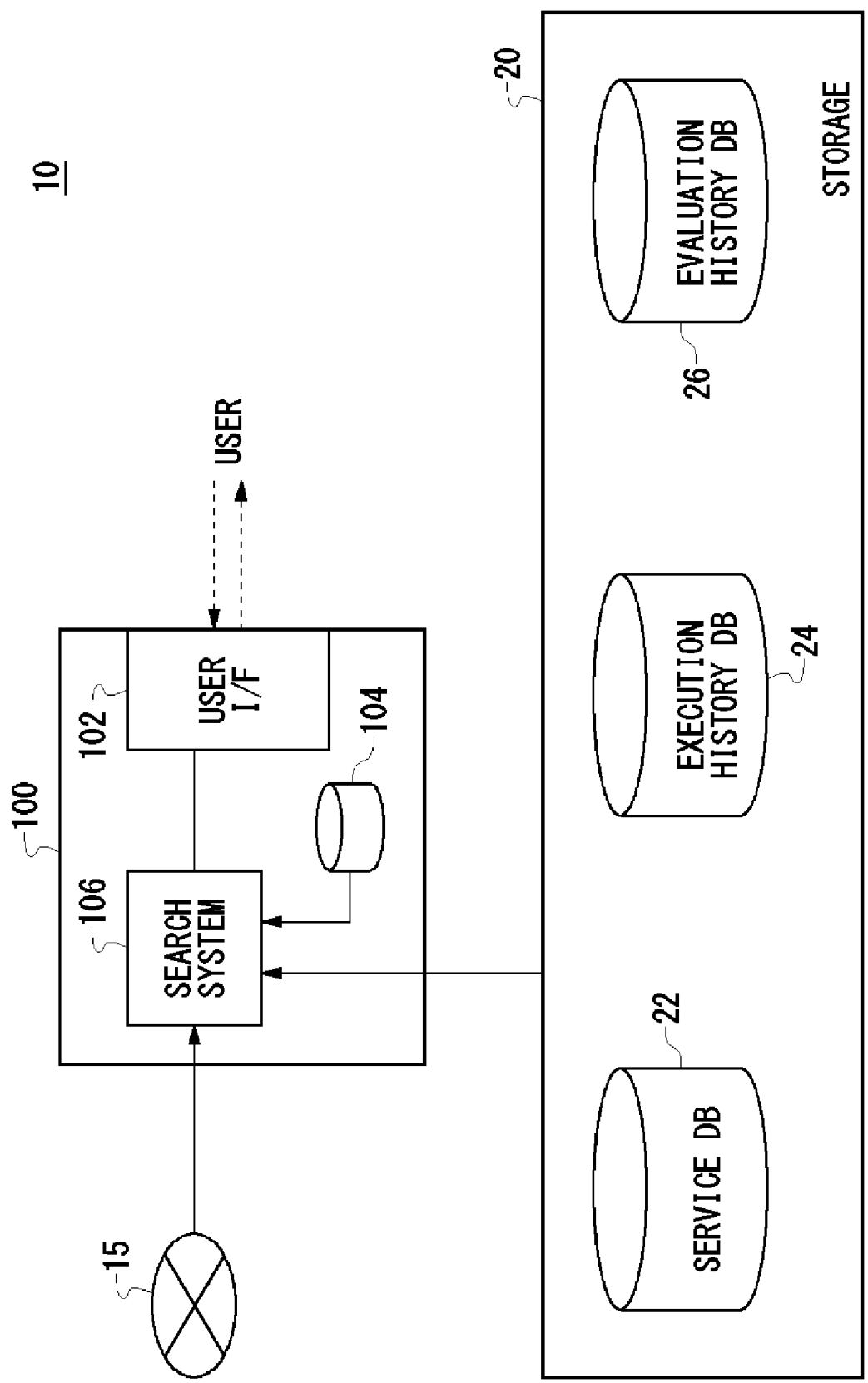
FIG. 1 shows an overall configuration of an information system 10 according to the present embodiment.

FIG. 1 shows an overall configuration of an information system 10 according to an embodiment of the invention. The information system 10 may include an information processing apparatus 100 and a storage 20. For example, the information processing apparatus 100 may include, as basic hardware, a user interface 102 such as a keyboard pointing device and a display apparatus, and a storage section 104 such as a memory chip. The information processing apparatus 100 may function as a search system 106 by causing a CPU to execute a program stored in the storage section 104.

The search system 106 may retrieve, from a communication network 15, a web service having a desired function based on a user input. An example of the communication network 15 may be a global communications network known as the Internet, which is available to general public. A service database (DB) 22, an execution history DB 24, and an evaluation history DB 26, which may be stored in the storage 20, may be accessed in the course of processing a search. FIG. 2A through FIG. 2C illustrate detailed examples that will be discussed below.

The service DB 22 may contain information pertaining to all known web services that are of interest. One example of a data structure that may be used by the service DB 22 is shown in FIG. 2A, according to an embodiment of the invention. For each of all the known web services to be searched, the service DB 22 may store identification information (ID) and a location of the web service. For example, if the web service is to be found on the Internet, then the location of the web service may be a URL (Uniform Resource Locator) for accessing the web service. According to FIG. 2A, an ID of a web service, "service1", may be stored in association with a URL http:// . . . /service1, and an ID of another web service, "service 2", may be stored in association with another URL http:// . . . /service2.

Once the URL of a web service is obtained, various other types of information regarding the web service may be accessible. For example, the search system 106 may access the URL of the web service to obtain additional information that defines the web service interface, such as corresponding WSDL files and UDDI repositories. The search system 106 may also transmit a set of input parameters to the URL of the web service, in order to execute the web service.

Note that the search in the present embodiment may be directed to web services having strictly defined types of input/output data, such as WSDL. However, the search according to the present invention may also comprise the actions of searching web applications that do not have strict types of input/output data that may be accessed by the HTTP GET request, e.g. REST (Representational State Transfer). The search system 106 according to the present embodiment may search such web applications whose input types are not strict, by estimating the types in an existing method.

Note that a search target may not be limited to a web service. The search target may more generically considered to be any function, as long as the search target responsively returns a set of output parameters for a set of input parameters. For example, the search system 106 may search for a subroutine having a predetermined function, from a library program in which object files of programs are archived. However, a web service, freely accessible by the general public on the communication network 15, may be preferable for the present embodiment, because of its readiness in collecting its execution history or the like. Thus, the term "web service" may be taken to mean any generic function, without departing from or limiting the scope of the invention.

FIG. 2B may illustrate one example of a data structure of an execution history DB 24 according to an embodiment of the invention. The execution history DB 24 may be an example of a first storage according to the present invention, and may include, for each of a plurality of web services, at least one set of input parameters having one or more values that are inputted to the web service and a set of output parameters returned from the function. In the example of FIG. 2B, a history is shown in which a value of "10483.6932" may be returned as a set of output parameters in response to input of a set of input parameters consisting of the value "100.0" to "service1".

Moreover, FIG. 2B shows a history in which a set of output parameters consisting of the values of "23,22" are returned in response to input of a set of three input parameters "23,36,15" to the "service0101". In this way, a web service may have two or more input parameters, and two or more output parameters. In such a case, the execution history DB 24 may store a number of dimensions of vectors corresponding to the number of parameters as input parameters and output parameters, respectively, as shown in FIG. 2B.

For each set of output parameters and input parameters, the execution history DB 24 may store a time at which the set of output parameters is returned in response to the set of input parameters. For example, the time at which the web service "service1" is executed is Dec. 1, 2007. Note that the time may include a time of a day, in addition to a date. Likewise, the time at which the service0101 is executed is Dec. 1, 2007. By recording the time in this manner, it becomes possible to accurately search web services whose outputs change chronologically. This is detailed later.

FIG. 2C may illustrate another example of a data structure of an evaluation history DB 26 according to an embodiment of the invention. According to this example, the evaluation history DB 26 is shown as an example of a second storage according to embodiments of the invention. The evaluation history DB 26 may store, for each of a plurality of web services, a history of a set of input parameters expected to be inputted to the web service, and a set of output parameters expected to be received from the web service in response to the set of input parameters . . . . As explained previously, the set of input parameters and the set of output parameters may be an input parameter and an output parameter inputted in the past in search of the web service. In this case, the evaluation history DB 26 may further store a date and a time of evaluation in association with the evaluation history.

For example, the first record in FIG. 2C indicates that "service1" has been retrieved as a result of inputting of the input parameter "120.0" and the output parameter "10500" from a user in the past. The evaluation result of "correct" indicates that the retrieved "service1" was a web service the user wishes to search for . . . . The second record in FIG. 2C indicates that "service1" has been retrieved as a result of inputting of the input parameter "110.0" and the output parameter "0.9" from a user in the past. The evaluation result of "incorrect" corresponding to these parameters indicates that the retrieved "service1" was not a web service that is searched for.

In this way, the evaluation history DB 26 may store each web service retrieval history that has been performed with use of parameters in the past, in association with an evaluation history indicating whether the search result was correct or incorrect. Here, the evaluation history may be a history of parameters received by the search system 106 itself by means of the functionality of an evaluation input section 240 detailed later. Alternatively, the evaluation history DB 26 may store the history of evaluation received by other various systems.

Note that FIGS. 2A-2C may show various types of data in a table format for explaining basic concepts; however the format is not limited to a table. For example, the various types of data may be described in extended markup language (XML). In this example, a service ID may be recorded with a tag that indicates that it is a service ID, a set of input parameters may be recorded with a tag that indicates that it is a set of input parameters, and a set of output parameter is recorded with a tag that indicates that it is a set of output parameters.

Figure 3:
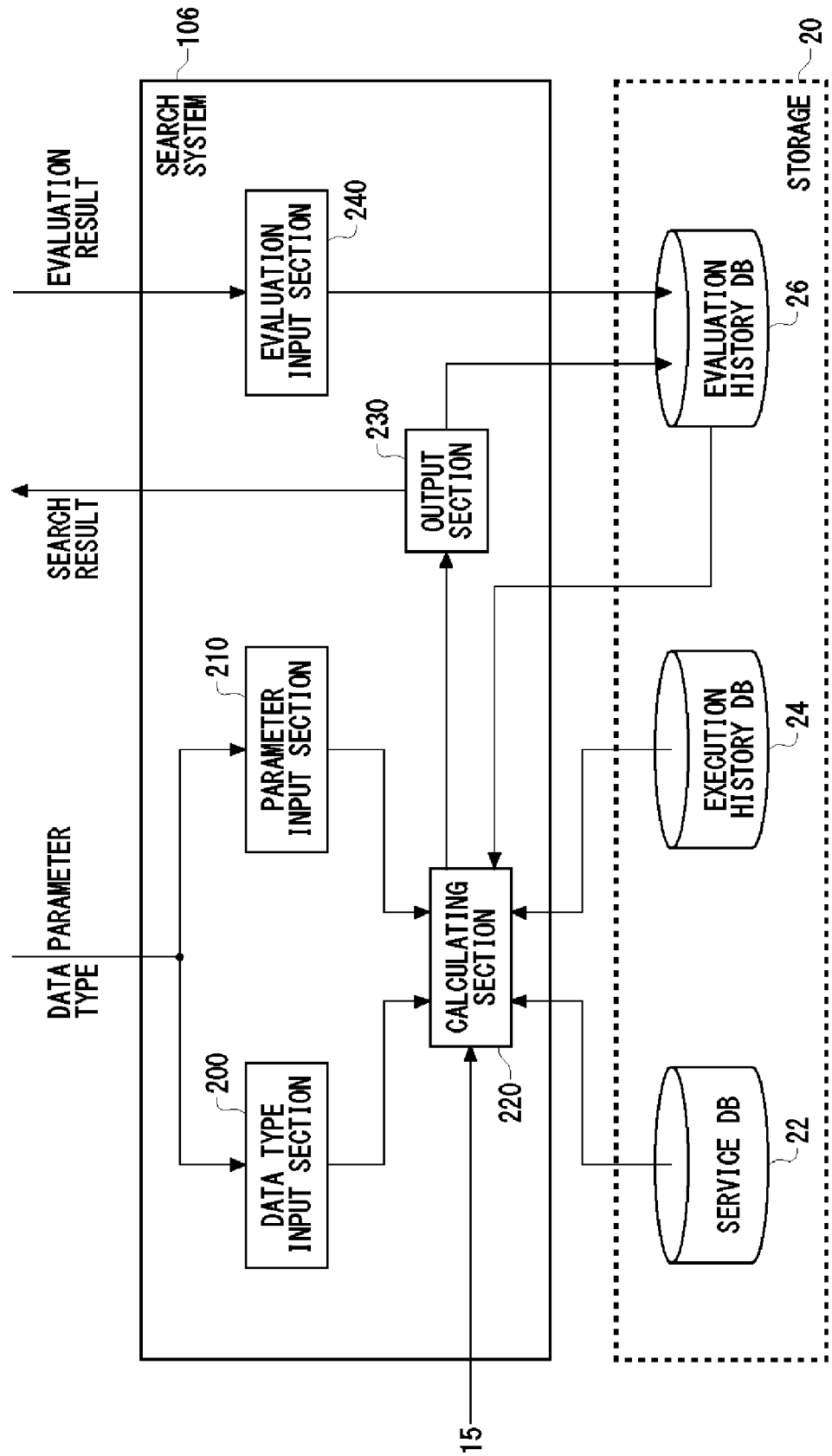
FIG. 3 shows a functional configuration of a search system 106 according to the present embodiment.

FIG. 3 shows a functional configuration of a search system 106 according to an embodiment of the invention. The search system 106 may include a data type input section 200, a parameter input section 210, a calculating section 220, an output section 230, and an evaluation input section 240. The data type input section 200 may receive as input a data type of an input parameter of a web service that is sought and a data type of a set of output parameters of the web service. When there is a plurality of input parameters, the data type input section 200 may receive as input the data type of each one of the plurality of input parameters. When there is a plurality of output parameters, the data type input section 200 may receive as input the data type of each one of the plurality of output parameters.

The parameter input section 210 may receive as input a set of one or more input parameters to be provided to the web service being sought and a set of one or more output parameters expected to be outputted from the web service in response to the set of input parameters. Some web services may have a plurality of sets of input parameters and/or a plurality of sets of output parameters.

When the data types and the parameter sets have been received, the calculating section 220 may then retrieve a web service having a data type that matches the inputted data type(s). For example, when the function in the services DB 22 is a web service, the calculating section 220 may access URLs of known web services stored in the service DB 22 to obtain the WSDL files corresponding to the web services. Then the calculating section 220 may determine, for each obtained WSDL file, whether the inputted data type(s) match the data type of the input parameter(s) and the data type of the output parameter(s) in the WSDL file . . . . The data type may indicate accuracy or a type of a numerical value, such as a double precision floating point number (double type). The data type may also indicate a kind of data such as an integer (integer type), a decimal number (float type), or a string (string type). The data type may further indicate the number of numerical values to be inputted or outputted (e.g. two integer numbers). The string type may be further grouped, for example, into an encode format for indicating whether it is a data format for an address, a data format for a name, etc.

A web service whose data types match may be subjected to further index value calculation processing. More specifically, for each web service whose data types match, the calculating section 220 may first select an execution history associated with the web service from the execution history DB 24. Then the calculating section 220 may calculate first index values indicating proximity of the inputted set of input parameter(s) and output parameter(s) to each of the sets of input parameters and sets of output parameters stored in the execution history DB 24. Alternatively, the calculating section 220 may calculate first index values indicating proximity of an inputted set of output parameters to each of the output parameters stored in the execution history DB 24. The calculating section 220 may then sum calculated first index values for each function.

As it is used here, the term "proximity" may be a measure of the difference in length between two vectors when the parameters contained in the set of input parameter(s) and the set of output parameter(s) are represented as vectors, and/or how small the difference in angles of the vector is. For example, consider a case where a set of input parameters P and an output parameter Q stored in the execution history DB 24 are represented as a vector R=(P,Q), and an inputted set of an input parameter X and an output parameter Y are represented as a vector A=(X, Y). In this case, the first index value may be 1/|R−A|. Note that |W| may represent a distance of a vector W, and so $|R-A|=\sqrt{(P-X)^2+(Q-Y)^2}$ Then for each web service whose data type(s) match(es), the calculating section 220 may select an evaluation history associated with the web service from the evaluation history DB 26. Then the calculating section 220 may calculate second index values respectively indicating proximity to the inputted set of input parameter(s) and output parameter(s) to each of the sets of input parameter(s) and output parameter(s) stored in the evaluation history DB 26. Then the calculating section 220 may sum these calculated second index values for each function.

For each set of input parameter(s) and output parameter(s) stored in the evaluation history DB 26, when the set of parameters is associated with an evaluation result of "correct", the calculating section 220 may add an index value indicating the proximity of the value to the sum of the second index values. However, when the set of parameters in the evaluation history DB 26 is associated with an evaluation result of "incorrect", the calculating section 220 may subtract an index value indicating the proximity of the value from the sum of the second index values.

The calculating section 220 may sum the first index values and the second index values calculated in the above manner for each function. It may be desirable that the calculating section 220 performs the summation by adding a higher weight to the first index values instead of the second index values. It may be preferable to perform the summation by adding a weight of 1 to the first index values and by adding to the second index values a reliability level that depends upon the evaluation result to the second index values, where the reliability level is a number in the range of 0 to 1 inclusive.

The output section 230 may then select a web service having a sum of first index values and second index values calculated in this manner that is larger than a predetermined value, and may output the selected web service as a search result. For example, the output section 230 may display web services having a sum of first index values and second index values that is larger than a predetermined value, with the web services being ordered according to the value of the sum. The display may be performed by placing web services having larger sums higher in the screen, and web services having smaller sums lower in the screen. Alternatively, the output section 230 may select a predetermined number of web services in the order from the web service having the largest sum and display only the selected number of web services, without displaying the unselected web services.

In the display, the name of a web service and the URL indicating the position of the web service may be displayed. Optionally, the contents of the WSDL or the contents of the UDDI corresponding to the web service may be presented in the display.

The evaluation input section 240 may receive an input of an evaluation result of a user that indicates, for each function outputted from the output section 230, whether the function is what the user is searching for. The evaluation input section 240 may store, in the evaluation history DB 26, the received evaluation result in association with the set of input parameters and the set of output parameters inputted by the data type input section 200, so that the evaluation result can be reflected in the subsequent retrievals. This arrangement may be expected to improve the search accuracy.

Figure 4:
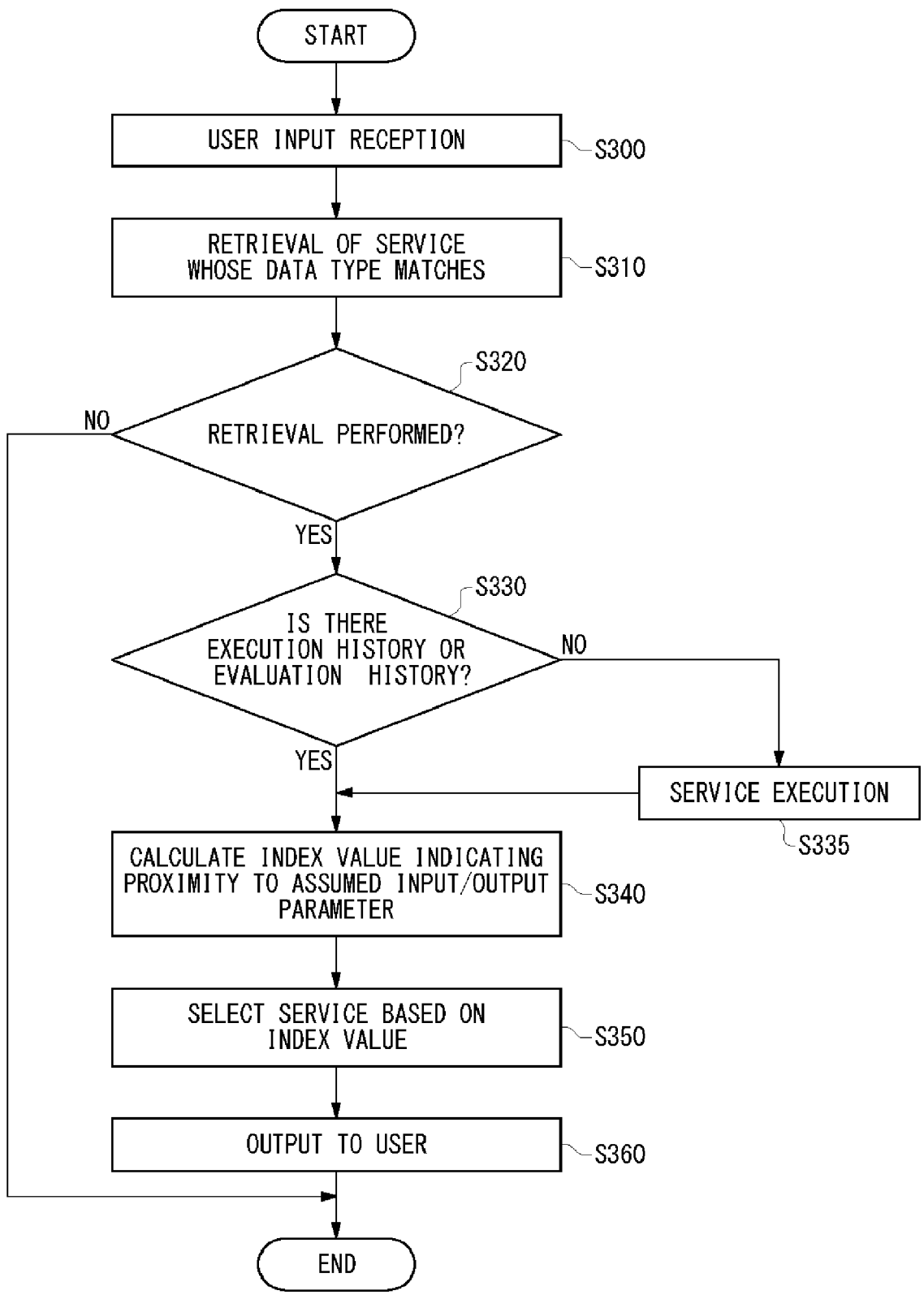
FIG. 4 shows a process flow performed by a search system to search for a service based on a user input, according to the present embodiment.

FIG. 4 shows a flowchart for a process performed by the search system 106 for searching for a web service based on a user input, according to an embodiment of the invention. As criteria for the search, the user may provide inputs for the desired web service, according to the step labeled S300. The parameter input section 210 may receive as user input a set of input parameters to be provided to the web service sought by the user and a set of output parameters expected to be provided by the web service in response to the set of input parameters. Also, the data type input section 200 may receive as user input a data type for the set of input parameters and a data type of the set of output parameters.

On receiving these inputs, the calculating section 220 may retrieve all web services having data types matching the data types input by the user, according to the step labeled as S310. For example, the calculating section 220 may search the web services stored in the service DB 22 to obtain the URLs of the web services, so that the WSDL files for each web service can be obtained; the calculating section 220 may then compare the inputted data type(s) with the data type(s) defined in the WSDL file to determine if the web service meets the search criteria. Each web service having data types that match the input data types may be subjected to further index value calculation processing.

Note that when there is no web service whose data type matches (NO branch from the step labeled S320), then the search system 106 may terminate processing, because of difficulty of web service search. Otherwise, for each web service whose data type matches the input data type(s), the calculating section 220 may retrieve a corresponding execution history from the execution history DB 24 and an evaluation result from the evaluation history DB 26, according to the step labeled S330.

When there is no execution history retrieved (NO branch from step labeled S330), the calculating section 220 may provide the inputted set of input parameters to each web service whose data type matches, thereby executing the web service and causing it to output an output parameter, according to the step labeled S335. The set of input parameters and output parameters obtained in this way may be stored as an execution history entry for the web service in the execution history DB 24.

Then the calculating section 220 may calculate each first index value indicating proximity of the inputted set of input parameters and output parameters, to each set of input parameters and output parameters stored in the execution history DB 24 (S340). Then the calculating section 220 may sum these calculated first index values for each function. For each web service whose data type matches, the calculating section 220 may select an evaluation history associated with the web service from the evaluation history DB 26.

The calculating section 220 may calculate each second index value indicating proximity of each set of input parameters and output parameters stored in the evaluation history DB 26, to the inputted set of input parameters and output parameters. Then the calculating section 220 may sum these calculated second index values for each function. In the summing operation, a variety of weights may optionally be added to the index value. In addition, for efficient calculation, a portion that does not contribute much to the sum of the index values can be excluded from the calculation of the sum.

Figure 5:
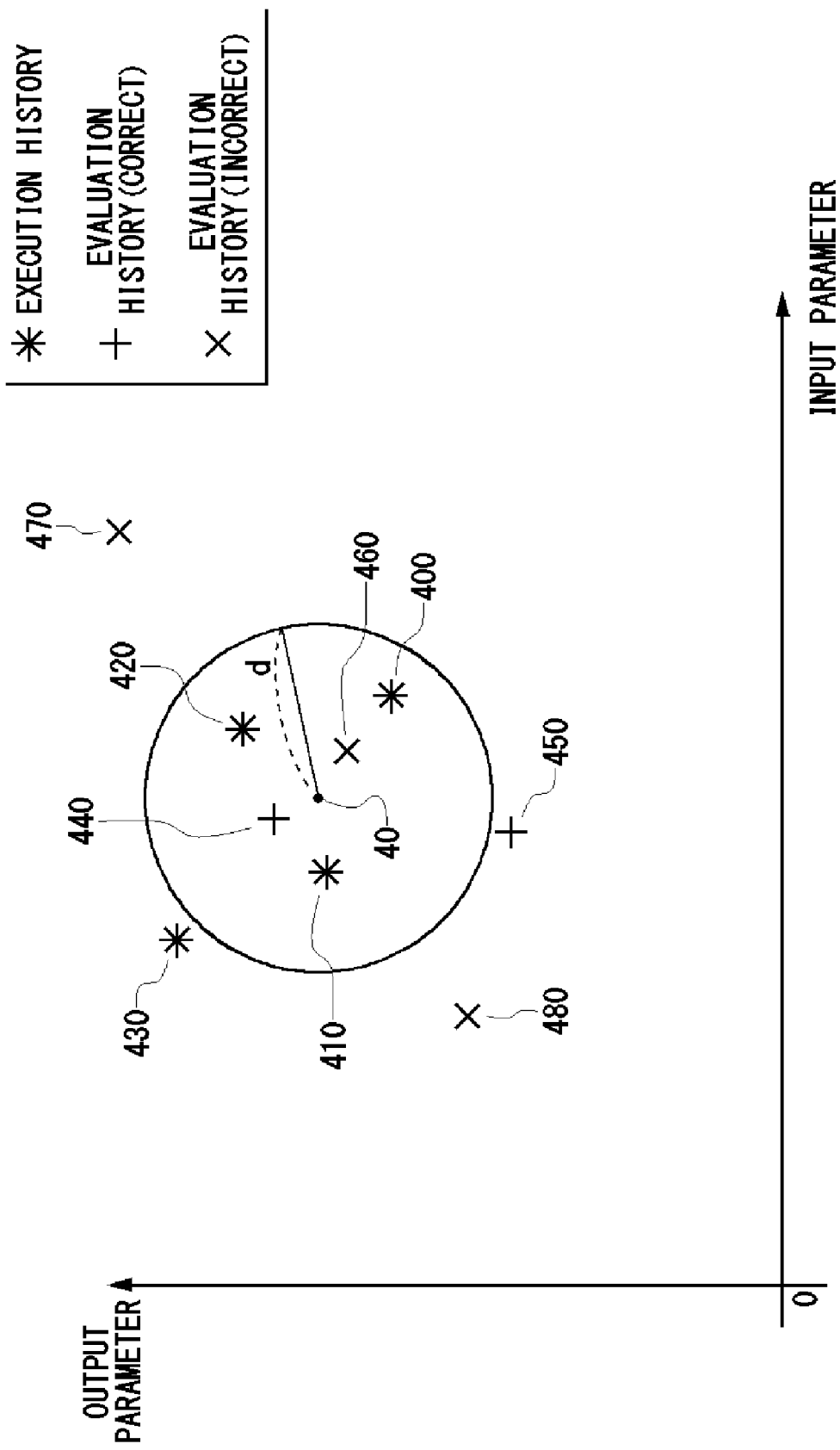
FIG. 5 is a conceptual diagram showing parameter search processing performed by a search system according to the present embodiment.

One example of the above calculation may be shown graphically in FIG. 5, which depicts a conceptual diagram showing parameters search processing performed by the search system 106 according to an embodiment of the invention. Here, the set of input parameters and output parameters provided by the user may be represented as a vector x. This vector x may correspond to an assumed parameter 40 in FIG. 5.

Then the calculating section 220 may retrieve all execution history values in the execution history DB 24 and evaluation history values in the evaluation history DB 26, where the distance of each such value from the vector x is less than or equal to a constant value d. Each of the retrieved histories is referred to as vector c. According to FIG. 5, an execution history 400, an execution history 410, and an execution history 420 may be as execution histories, while an execution history 430 may not retrieved. In addition, an evaluation history 440 and an evaluation history 460 may be retrieved as evaluation histories, while not retrieving an evaluation history 450, an evaluation history 470, and an evaluation history 480.

The collection of vectors c retrieved in this way may be referred to as C. The collection C may calculated as follows:

$$C=\{c; |c-x| \leq d\}$$

A function that simply decreases according to the distance between the vector c and the vector x $$\left(\text{e.g.} \frac{1}{|c-x|}\right)$$

may be denoted as g(c|x). The calculating section 220 may calculate the total number of histories corresponding to a service j stored in the execution history DB 24 and the evaluation history DB 26, where the service j indicates each service. The total number may be denoted as count(j|C). In addition, a weight to be added to a history c corresponding to the service j may be denoted as $f(c, j)$.

The range of the function $f(c, j)$ may be defined as follows:

0: when the history c associated with the service j is not included in any of the execution history DB 24 and the evaluation history DB 26;

1: when the history c associated with the service j is included in the execution history DB 24;

a: when the history c associated with the service j is included in the evaluation history DB 26 and the corresponding evaluation history is "correct"; and −b: when the history c associated with the service j is included in the evaluation history DB 26, and the corresponding evaluation history is "incorrect".

Note that a and b may be a constant in a range of 0 to 1, inclusive. Note also that the constants a and b may indicate the reliability level of the evaluation result, i.e. to what extent the evaluation by a user is correct. For example, the constants a and b may be obtained by the following equations based on the result of testing sample data in advance:

a=(the number of times that a user evaluated a correct search result as "correct")/(the number of times that the user evaluated a correct search result as "correct"+the number of times that the user evaluated a correct search result as "incorrect").

b=(the number of times that a user evaluated an incorrect search result as "incorrect")/(the number of times that the user evaluated an incorrect search result as "incorrect"+the number of times that the user evaluated an incorrect search result as "correct")

Then the calculating section 220 may calculate the sum h(j|x) between first index values and second index values regarding the service j with respect to the vector x indicating an inputted set of parameters, as in the following expression:

$$h(j \mid x) = \sum_{c \in C} \frac{f(c, j) g(c \mid x)}{\text{count}(j \mid C)}$$

As a result, in the example of FIG. 5, the index value indicating proximity between the assumed parameter 40 and each of the execution history 400, the execution history 410, and the execution history 420 may be added to the sum, after added a higher weight than for other index values, while the index value indicating proximity between the evaluation history 440 and the assumed parameter 40 may be added to the sum, after added a lower weight than for other index values. On the other hand, the index value indicating proximity between the evaluation history 460 and the assumed parameter 40 may be subtracted from the sum.

Note that FIG. 5 deals with a case where there is one input parameter and one output parameter. When the number of input parameters is m and the number of output parameters is n, an evaluation value may be calculated based on a distance between vectors in the space of m+n dimensions. However for example when calculating an evaluation value after converting an input parameter of a single dimension into two dimensions, an index value may be calculated in a higher dimension than the m+n dimensions, even when the number of input parameters is m and the number of output parameters is n. This may occur for example when an input parameter indicating an address is used for calculating an index value, after converted into input parameters representing latitude and longitude respectively.

In addition, the following calculation may be performed in the example of FIG. 2B and FIG. 2C. Assume that an inputted input parameter is 100 (double type), and an inputted output parameter is 11000 (double type). These parameters may be inputted for retrieving a service enabling the conversion of 100 U.S. dollars into 11000 yen and output 11000 yen.

In response to these inputs, the calculating section 220 may calculate a square root of $1/((100-100)^2+(11000-10483.6932)^2)$, as a first index value, in association with the service1 whose data type matches that which is stored in the execution history DB 24. The calculation result is 0.002.

Likewise, the calculating section 220 may calculate a square root of $1/((100-100)^2+(11000-0.8708)^2)$ in association with the service2 whose data type matches that is stored in the execution history DB 24. The calculation result is 0.00009.

The evaluation history of the service1 may be stored in the evaluation history DB 26. Regarding this, the calculating section 220 may calculate a square root of $1/((120-100)^2+(11000-10500)^2)$, as a second index value. The calculation result is 0.002. This may correspond to the evaluation result of "correct", and so this may be added to the sum of index values.

In addition, the calculating section 220 may calculate a square root of $1/((110-100)^2+(11000-0.9)^2)$, as a second index value. The calculation result is 0.00009. This may correspond to the evaluation result of "incorrect", and so must be subtracted from the sum of index values. For example, this evaluation result may indicate that even though input has been performed to search for a service for converting Japanese Yen into U.S. dollar, i.e. not a service for converting U.S. dollar into Japanese Yen, its search result was not the desired service ("incorrect").

According to the above result, for the service1, the sum of index values is calculated as 0.002+0.002−0.00009, which is about 0.00399. In this way, even though the history may correspond to an "incorrect" evaluation result, if it is associated with a set of parameters far from the inputted parameters, the numerical value subtracted from the sum of index values is small. In addition, the sum of index values for service2 will be 0.00009. As a result, the service1 having a larger sum of index values will be selected as a priority.

When at least one of the input parameters and the output parameters is non-numerical data i.e. data of a string type, it may be desirable for the calculating section 220 to calculate an index value after converting the non-numerical data into a numerical value. For example, the calculating section 220 may convert a string indicating an address into two-dimensional numerical data indicating the latitude and the longitude of the address. In order to perform such processing, a database including a string indicating an address associated with its latitude and longitude may be used. In addition, the calculating section 220 may convert data indicating the base sequence of DNA into data indicating Edit distance. In addition, the calculating section 220 may normalize the numerical value indicating each parameter using mean/deviation assuming a normal distribution.

When operation of a web service changes chronologically, e.g. when the exchange rate between dollars and yen changes in a service for converting U.S. dollar into Japanese yen, it may be desirable to record as an event the time the rate changed as either an execution history or as an evaluation history. For example, the calculating section 220 may sum an index value based on a set of output parameters associated with a later time after assigning thereto a higher weight than to the index value based on the set of output parameters associated with an earlier time. Accordingly, it is possible to perform accurate search even in such a web service.

Returning to the explanation of FIG. 4, the output section 230 may select a web service having a sum of first index values and second index values calculated in this way, which is larger than a predetermined value, and may output the selected web service as a search result, according to the step labeled S350. For example, the output section 230 may display web services having a sum of first index values and second index values that is larger than a predetermined value, in the order from web services having larger sums. The display may be performed by placing web services having larger sums higher in the screen, and web services having smaller sums lower in the screen.

Figure 6:
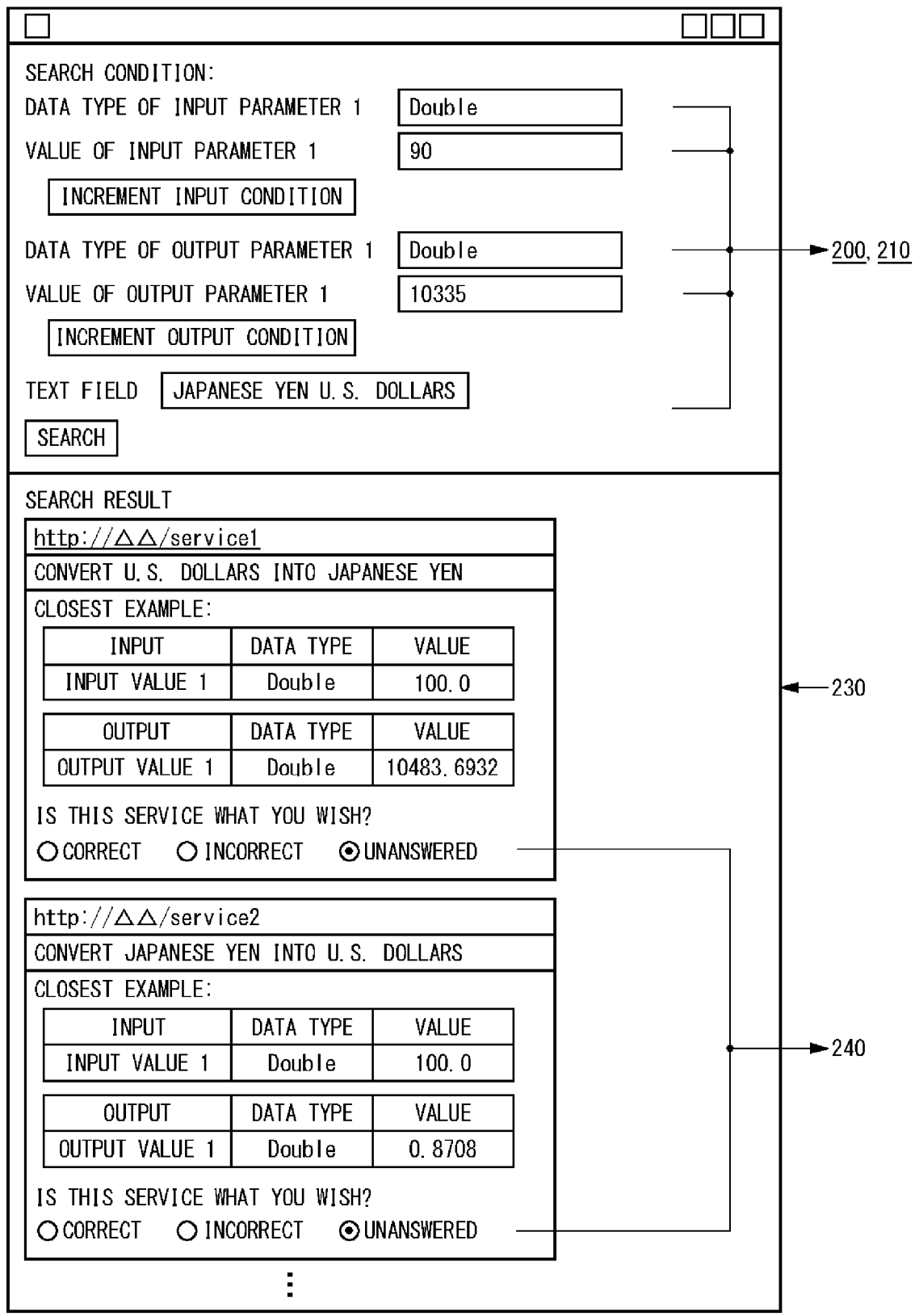
FIG. 6 shows one example of a display in an output section according to the present embodiment.

An exemplary display may be seen in FIG. 6, which shows one example of a display in an output section 230 according to an embodiment of the invention. The output section 230 may display an input field for the data type input section 200 and the parameter input section 210 to receive an input. FIG. 6 shows exemplary input fields for respectively receiving, as search conditions, a data type of an input parameter 1, a value of the input parameter 1, a data type of an output parameter 1, and a value of the output parameter 1. The data in these input fields may be inputted to the data type input section 200 and to the parameter input section 210.

When the button of "increment the input condition" or "increment the output condition" is pushed, these input fields may display an incremented number. Furthermore, the output section 230 may display a text field for text input for web service search. The text inputted to the text field may be used for searching a comment field or a description field recorded in the WSDL file of a web service or the like. The calculating section 220 may subject only web services to which such text search has been performed, to processing for calculating an index value. In this way, a user may be able to accurately retrieve a web service having a desirable function, by combining conditions from various perspectives.

When the search button is pushed, various types of processing may be initiated, such as the data type input section 200, the parameter input section 210, the calculating section 220, and the output section 230. The output section 230 may display the search result lower than these input fields. A plurality of web services having a sum of first index values and second index values that is larger than a predetermined value may be displayed as the search result. Note that the service1 for converting U.S. dollars into Japanese yen my be displayed higher in position than the service2 for converting Japanese yen into U.S. dollars, for example, meaning higher priority for the service1 over the service 2.

For example, the output section 230 may display the URL and the name of a web service first. The output section 230 may also display a set of parameters that is closest to a set of parameters inputted through the parameter input section 210, from the execution histories associated with the web service, and may display the selected set of parameters. The output section 230 may also display an input field for an evaluation result indicating whether the thus retrieved service is the service searched for by a user. The evaluation result inputted to this input field is inputted to the evaluation input section 240.

According to the embodiments described so far with reference to FIGS. 1-6, it may be possible to retrieve a web service that a user searches for from among numerous web services whose function is unknown. The web service search may be performed by combining various perspectives such as a data type, a text search, an execution history, and an evaluation history, which may improve the search accuracy. The search result may be accumulated as an evaluation history, which contributes to improvement in accuracy in subsequent searches. According to these characteristics, a service having a predetermined function may be adequately retrieved from among various web services widely publicly accessible on the Internet and the like, and is effectively made use of.

Figure 7:
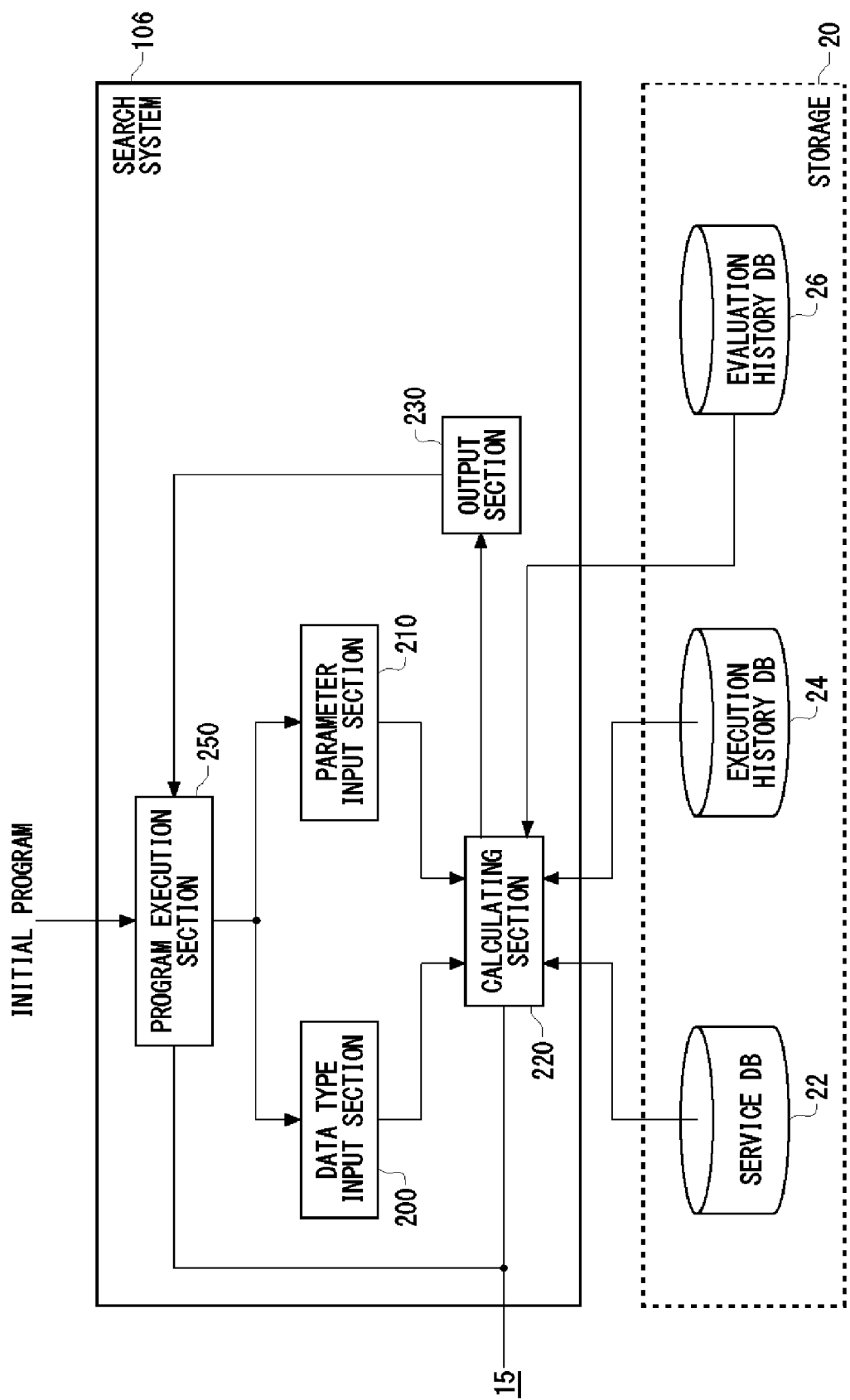
FIG. 7 shows a functional configuration of a search system according to a modification example of the present embodiment.
Figure 8:
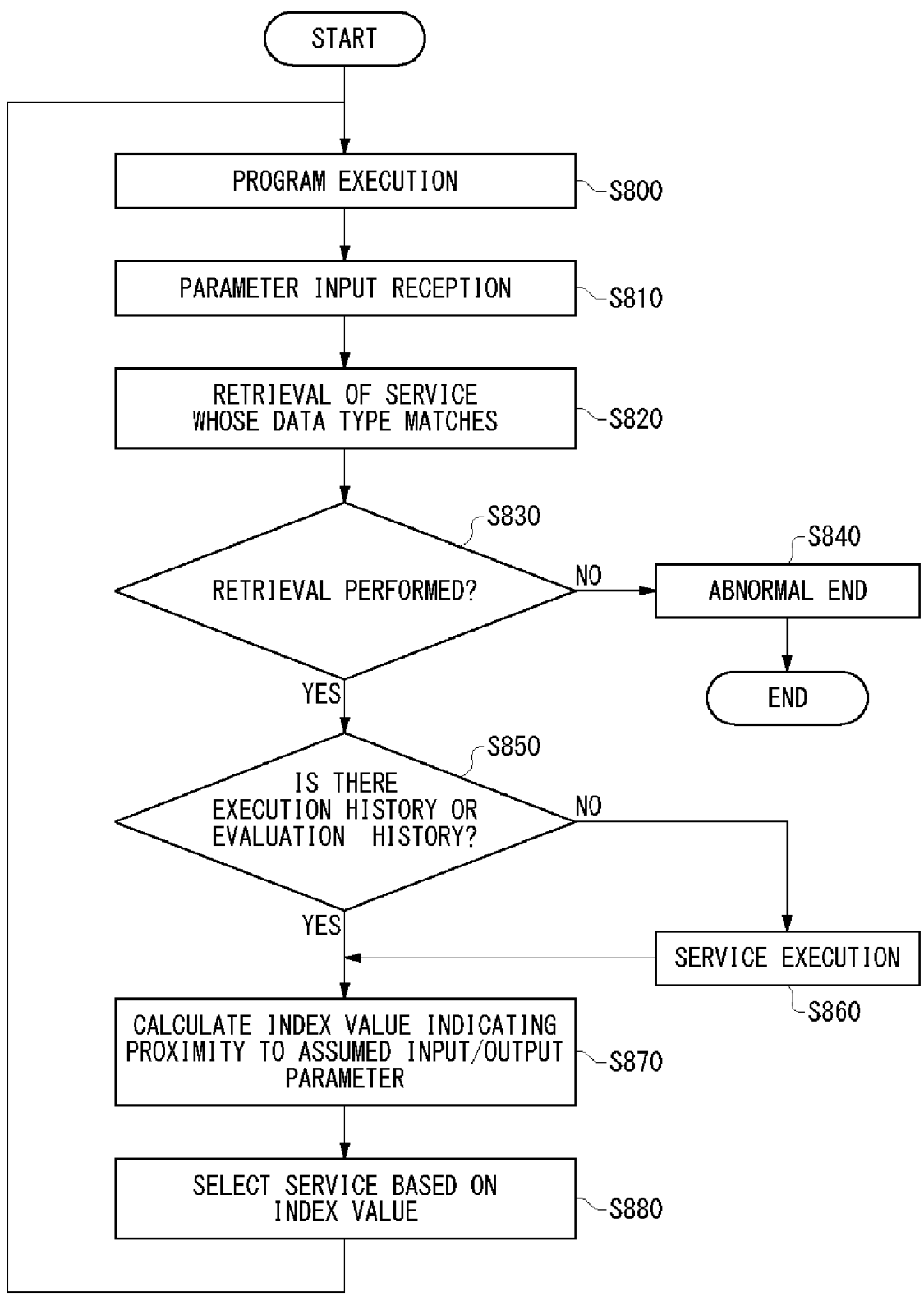
FIG. 8 shows a process flow performed by the search system to search for a service based on a user input, according to the modification example of the present embodiment.

Note that during execution of a program for calling a web service, the web service may be retrieved by so-called "on the fly" as necessary, and be executed immediately after the retrieval. A search system 106 that exemplifies such processing is shown in FIG. 7 and FIG. 8 as a modification example. FIG. 7 shows a functional configuration of a search system 106 according to a modification example of the present embodiment. The search system 106 according to the present modification example may include a program execution section 250 in addition to the search system 106 of FIG. 3. The search system 106 according to the present modification example may not be equipped with an evaluation input section 240.

The program execution section 250 may execute an initial program inputted by a user. Execution of this program may sometimes require the execution of a web service. Concretely, this program has described therein a set of input parameters and output parameters and a set of data types thereof to be inputted for retrieving the web service when execution of the web service becomes necessary.

When execution of a web service becomes necessary, the program execution section 250 may receive a set of input parameters and output parameters and their data types necessary for the retrieval, and provide them to the data type input section 200 and the parameter input section 210. That is, the data type input section 200 receives input of the data types of the input parameters and the output parameters, from the program under execution, and the parameter input section 210 receives input of the input parameters and the output parameters from the program under execution.

The processing of the calculating section 220 has been explained previously, with reference to FIGS. 1-6. However note that the output section 230 may select a single web service that has the largest index value of all the calculated index values. The program execution section 250 may execute the selected web service, thereby returning the execution result to the initial program in execution.

FIG. 8 shows a process flow performed by the search system 106 to search for a service based on a user input, according to the modification example of the present embodiment. The program execution section 250 executes an initial program inputted by a user, according to the block labeled S800. The data type input section 200 may receive an input of the data types of a set of input parameters and output parameters, from the program under execution, according to the block labeled S810. The parameter input section 210 may receive input of the input parameters and the output parameters from the program under execution.

On receiving these inputs, the calculating section 220 first retrieves web services whose data type matches the input data type, according to the block labeled S820. For example, the calculating section 220 may access URLs of web services stored in the service DB 22, to obtain the WSDL files corresponding to the web services. Then the calculating section 220 may determine, for each obtained WSDL file, whether the inputted data type(s) match the data type of the input parameter(s) and the data type of the output parameter(s) defined in the WSDL file. The web service whose data types match may be subjected to further index value calculation processing.

Note that when there is no web service whose data type matches (according to the NO branch from decision block S830), then the program executing section 250 may subject the program to abnormal ending, according to the block labeled S840, because of difficulty in continuing the program execution. Otherwise, the calculating section 220 may retrieve, for each web service whose data type matches, an execution history associated with the web service from the execution history DB 24, and may retrieve an evaluation result associated with the web service from the evaluation history DB 26, according to the block labeled S850.

When there is no history retrieved (i.e. if the result of decision block S850 is NO), the calculating section 220 may actually input the inputted input parameters to each web service whose data type matches for execution, thereby causing the web service to output an output parameter, according to the block labeled S860. The set of input parameters and output parameters obtained in this way may be stored in the execution history DB 24.

Then the calculating section 220 may calculate each first index value indicating proximity of the inputted set of input parameters and output parameters, to each set of input parameters and output parameters stored in the execution history DB 24, according to the block labeled S870. Then the calculating section 220 may sum the calculated first index values for each function. For each web service whose data type matches, the calculating section 220 may select an evaluation history associated with the web service from the evaluation history DB 26.

The calculating section 220 may calculate each second index value indicating proximity of each set of input parameters and output parameters stored in the evaluation history DB 26, to the inputted set of input parameters and output parameters. The calculating section 220 may then sum the calculated second index values for each function. In the summing operation, it is possible to add a variety of weight to the index value as already described above. In addition, for efficient calculation, a portion that does not contribute much to the sum of the index values may be excluded in the calculation of the sum.

The output section 230 may select a single web service that has the largest index value of all the calculated index values, according to the block labeled S880. The program executing section 250 may return processing to block S800, and may execute the selected web service. As described so far, the present modification example may enable the initial program to execute a multitude of web services automatically by sequential retrieval, even without designing subroutines in advance.

Next, FIG. 9 and FIG. 10 show examples of WSDL data 90, tModel data 12A of UDDI, and a search query 12B. FIG. 9 shows one example of the WSDL data 90 described using WSDL (getcurrency.wsdl) that corresponds to a service that is searched for in the present embodiment. The WSDL data 90 is stored, by being associated with a web service, in a server apparatus providing the web service, for example. This server apparatus may be connected to a communication network 15 according to the present embodiment.

As in the drawing, the WSDL data 90 has described therein various types of information assigned with tags, according to a notation method based on XML. For example, the WSDL data 90 defines a data type of input parameter denoted as "data type description 900A". The WSDL data 90 defines a data type of an output parameter as denoted as "data type description 900B". According to the definitions, the calculating section 220 according to the present embodiment may retrieve a web service whose data type matches the inputted data type adequately, as an index value calculation target.

FIG. 10 shows one example of a tModel data 12A and a search query 12B corresponding to a service searched for, according to an embodiment of the invention. The tModel data 12A may also be stored, by being associated with a web service, in a server apparatus providing the web service, for example.

The tModel data 12A may include a description portion indicating the contents and the kind of the service for example "comment description 1200". This description portion may be a keyword search target explained above with reference to FIG. 6. The tModel data 12A may include text data representing the contents and the kind of the service as a key name (e.g. shown as "key name 1210"). This text data may also be a keyword search target.

The tModel data 12A may define a data type of an input parameter (e.g. denoted as "data type description 1220"). The search query 12B may define a data type of a set of input parameters being a search target (e.g. denoted as "key name 1230"). Based on such definitions, the calculating section 220 according to the present embodiment may be able to adequately retrieve a web service whose data type matches the inputted data type as an index value calculation target.

Figure 11:
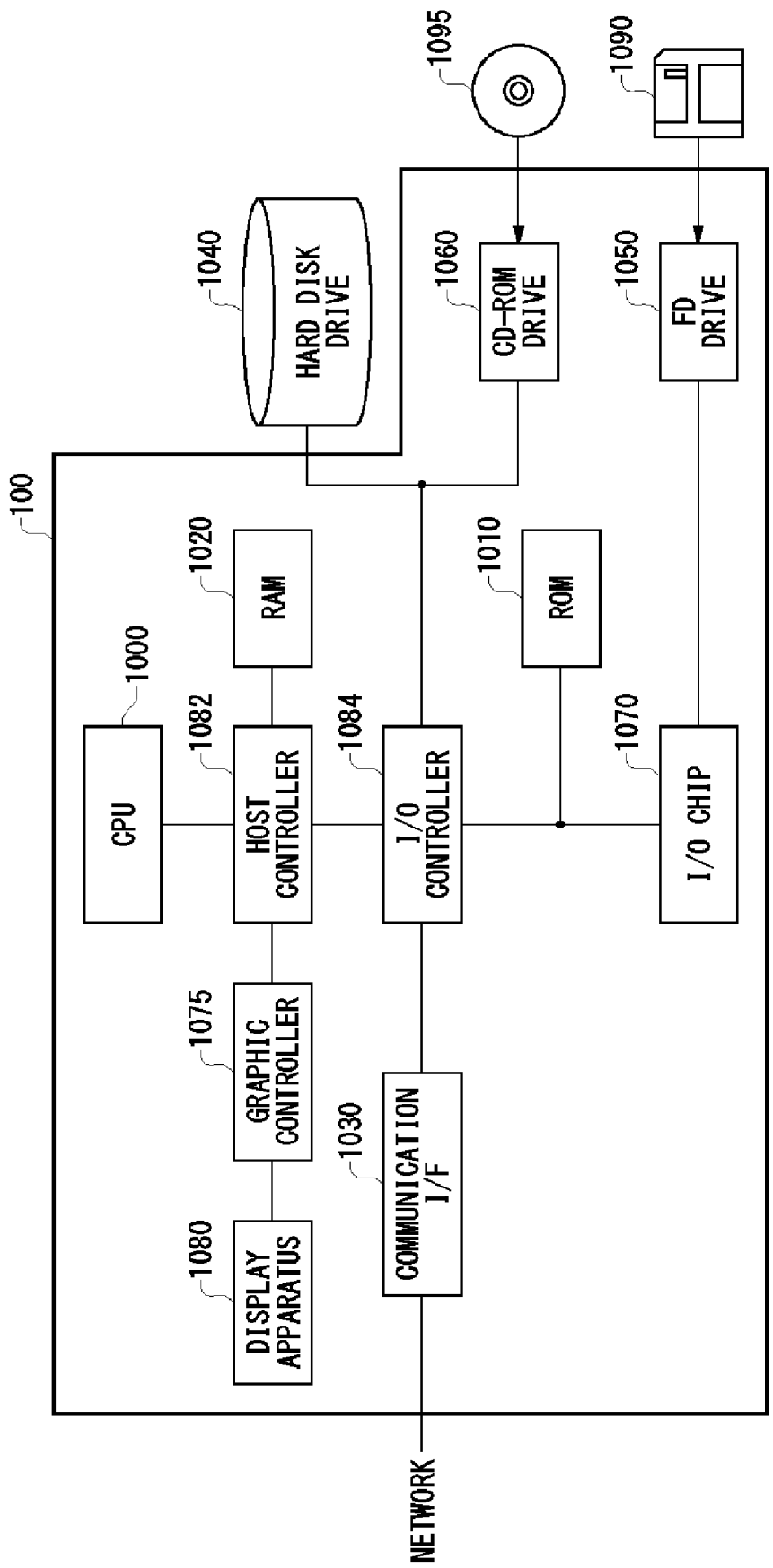
FIG. 11 shows one example of a hardware configuration of the information processing apparatus according to the present embodiment.

FIG. 11 shows one example of an information processing apparatus 100 and its peripheral hardware configuration according to an embodiment of the present invention. The information processing apparatus 100 may be provided with a CPU peripheral section that includes a CPU 1000, a RAM 1020, a graphic controller 1075; an input/output section that includes a communication interface 1030, a hard disk drive 1040, and a CD-ROM drive 1060, all of which may be connected to the host controller 1082 by an input/output controller 1084; and a legacy input/output section that includes a ROM 1010, a flexible disk drive 1050, and a input/output chip 1070, all of which may be connected to the input/output controller 1084.

The host controller 1082 may be connected to the RAM 1020 and may also be connected to the CPU 1000 and the graphic controller 1075 accessing the RAM 1020 at a high transfer rate. The CPU 1000 may operate to control each section based on programs stored in the ROM 1010 and the RAM 1020. The graphic controller 1075 may obtain image data generated by the CPU 1000 or the like on a frame buffer disposed inside the RAM 1020 and may display the image data in a display apparatus 1080. Alternatively, the graphic controller 1075 may internally include the frame buffer storing the image data generated by the CPU 1000 or the like.

The input/output controller 1084 may connect the hard disk drive 1040 serving as a relatively high speed input/output apparatus, the communication interface 1030, the hard disk drive 1040, and the CD-ROM drive 1060 to the host controller 1082. The communication interface 1030 may communicate with an external apparatus via a network. The hard disk drive 1040 may be provided for realizing the storage 20 for example, and may store the programs and data used by the information processing apparatus 100. The CD-ROM drive 1060 may read the programs and data from a CD-ROM 1095 and provide the read information to the RAM 1020 and to the hard disk drive 1040.

Furthermore, the input/output controller 1084 may be connected to the ROM 1010, and may also be connected to the flexible disk drive 1050 with the input/output chip 1070 serving as a relatively low speed input/output apparatus. The ROM 1010 may store a boot program performed by the CPU 1000 when the information processing apparatus 100 starts up, a program relying on the hardware of the information processing apparatus 100, and the like. The flexible disk drive 1050 may read programs or data from a flexible disk 1090 and supply the read programs or data to the hard disk drive 1040 or the RAM 1020 via the input/output chip 1070. The input/output chip 1070 may connect the flexible disk 1090 to a variety of input/output apparatuses via, for example, a parallel port, a serial port, a keyboard port, a mouse port, or the like.

A program executed by the information processing apparatus 100 may be provided by a user in a state where it is stored in a storage medium, such as the flexible disk 1090, the CD-ROM 1095, or an IC card. The program may be read from the storage medium via the input/output chip 1070 and/or the input/output controller 1084, and may be installed in the information processing apparatus 100 to be executed. Since the operation which the information processing apparatus 100 or the like performs according to the program may be the same as the operation performed by the information processing apparatus 100 already described in relation to FIGS. 1-10, and so the explanation thereof is omitted here.

The programs shown above may be stored in an external storage medium. In addition to the flexible disk 1090 and the CD-ROM 1095, an optical recording medium such as a DVD or PD, a magnetooptical medium such as an MD, a tape medium, a semiconductor memory such as an IC card, or the like can be used as the recording medium. Furthermore, a storage such as a hard disk or a RAM disposed in a server system connected to a dedicated communication network or the Internet may be used as the storage medium and the programs may be provided to the information processing apparatus 100 via the network.

As described so far, embodiments of the present invention are able to conduct a search to retrieve a web service having a function that a user wishes to obtain and to output the web service more efficiently than before. For the search, an execution history of a service and a parameter input history used in retrieving the service may be used in addition to data types and keywords. By combining them, the information processing apparatus 100 according to the present invention may be able to accurately retrieve a web service having the functionality that a user wishes to obtain.

Upon receipt of an outputted search result, the information processing apparatus 100 may receive an input of an evaluation result showing whether the retrieved service is a service that the user is searching for. The evaluation result may be reflected in the database as a search result of the service. Accordingly, the search accuracy can be further enhanced by further utilizing the evaluation result in the subsequent searches.

Although some aspects of the present invention have been described by way of the exemplary embodiments, the technical scope of the present invention is not limited to the scope of the above description. It should be understood that those skilled in the art might make many changes and substitutions without departing from the spirit and the scope of the present invention which is defined only by the appended claims. For example, for web service searches, only the execution history may be used without using the evaluation history, or only the evaluation history may be used without using the execution history.

It would be recognized by those skilled in the art, that the invention described herein can take the form of an entirely hardware embodiment, an entirely software embodiment, or an embodiment containing both hardware and software elements. In an exemplary embodiment, the invention may be implemented in software, which includes but is not limited to firmware, resident software, microcode, etc.

In this case, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

What is claimed is:

1. A support system for searching for a first function, comprising:
 a non-transitory computer storage medium including a first storage configured to store at least one history for at least one second function, each second function having a set of parameters, the set of parameters comprising at least one known output parameter;
 an input section configured to receive an expected output parameter;
 a calculating section configured to calculate a first index indicating proximity of the expected output parameter to each known output parameter associated with each second function in the first storage and sum the calculated first indexes for each second function;
 the calculating section being configured to calculate a second index indicating proximity of the expected output parameter to each known output parameter stored in a second storage and sum the calculated second indexes for each respective second function,
 the calculating section being configured to add, to the sum of the calculated second indexes for each respective second function, an index indicating proximity of the expected output parameter to each known output parameter associated with each respective second function and stored in the second storage under the condition that the known output parameter is associated with an evaluation result indicating that the second function corresponding to each known output parameter is a correct function for a search in the past;
 the calculating section being configured to subtract, from the sum of the calculated second indexes for each respective second function, an index indicating proximity of the expected output parameter to each known output parameter associated with the respective second function and stored in the second storage under the condition that the known output parameter is associated with an evaluation result indicating that the respective second function corresponding to the known output parameter is not a correct function for a search in the past;
 an output section configured to output the respective second function having a sum of the calculated second indexes larger than a predetermined value,
 the output section being configured to output a selected second function, wherein the selected second function has a first sum of the first indexes larger than a predetermined value.

2. The system of claim 1, wherein
 the set of parameters includes a known input parameter, wherein the respective second function outputs the known output parameter in response to receiving a known input parameter;
 the input section is configured to receive an expected input parameter to be provided to the first function and an expected output parameter from the first function in response to the expected input parameter, and
 the calculating section is configured to calculate a first index indicating proximity of the expected input parameter and the expected output parameter to each pair of known input parameter and known output parameter associated with each second function in the first storage.

3. The system of claim 2, wherein
 the first function and the second function are web services,
 the first storage stores, in association with each known web service available on a communication network, at least one pair of a known input parameter of a web service and a known output parameter provided by the web service in response to the known input parameter,
 the input section is configured to receiver a pair of an expected input parameter and an expected output parameter to be provided from a searched web service in response to the expected input parameter, and
 the output section is configured to output a selected web service having the first sum of the first indexes larger than the predetermined value.

4. The system of claim 1, including:
 the second storage configured to store, in association with each of the at least one second function, a history of a known output parameter associated with each of the at least one second function through a search in the past.

5. The system of claim 4,
 wherein the second storage stores, in association with the known output parameter, an evaluation result indicating whether the respective second function is a correct function for the search based on the known output parameter.

6. The system of claim 5, wherein
 the calculating section is configured to add, to the first index based on the history stored in the first storage, a higher weight than that to the second index based on the history stored in the second storage, select a second function having a sum of indexes larger than a predetermined value, and output the selected second function.

7. The system of claim 5, including:
an evaluation input section configured to receive an evaluation result indicating, in association with each selected second function outputted from the output section, whether the selected second function is for a search by a user, and storing the received evaluation result in the second storage.

8. The system claim 3, wherein
the input section-is configured to receive an expected data type of an expected input parameter and an expected output parameter of a web service for the search, and
the calculating section is configured to select, from among web services having a data type matching the expected data type, one web service and output the selected web service.

9. The system of claim 3, wherein
the calculating section is configured to calculate the first index after converting non-numerical data into a numerical value under the condition that at least one of the known input parameter and the known output parameter is not numerical.

10. The system of claim 3, wherein
the first storage stores each output parameter in association with a time when the output parameter is outputted, and
the calculating section is configured to perform summation for each web service, by adding a weight higher than a weight for an index based on an output parameter associated with a first time, to an index value based on an output parameter associated with a second time later than the first time.

11. The system of claim 3, the system retrieving a web service necessary for execution during execution of a program, wherein
the input section is configured to input an input parameter and an output parameter from the program under execution, and
the output section is configured to include an execution section that is configured to select a web service having the largest first index value, execute the selected web service, and return the execution result to the program under execution.

12. A support system configured to search for a first function, comprising:
a non-transitory computer storage medium including a storage configured to store, for each of a plurality of second functions, a history of an output parameter inputted for a search of a function in the past and expected as an output of the searched function;
a parameter input section configured to input thereto an output parameter expected as an output from the first function for the current search;
a calculating section configured to calculate indexes respectively indicating proximity of the inputted output parameter to each of output parameters stored in the storage, and summing the calculated indexes for each respective second function; and
an output section configured to select from among the plurality of second functions, the second function having a sum of the indexes larger than a predetermined value, and output the selected second function,
wherein proximity is a measure of the difference in length between a first vector and a second vector, wherein the inputted output parameter received from the parameter input section is represented as the first vector and each output parameter stored in the storage is represented as a respective second vector.

13. A method for supporting a search for a first function, comprising:
storing a history of at least one output parameter of each of a plurality of second functions into a storage under control of a computer;
inputting an output parameter expected as an output from the first function for the search;
calculating index values respectively indicating proximity of the inputted output parameter to each of the output parameters stored in the storage, and summing the calculated index values for each respective second function, under control of the computer; and
selecting, from among the plurality of second functions, a second function having a sum of index values larger than a predetermined value, and outputting the selected second function,
wherein proximity is a measure of the difference in length between a first vector and a second vector, wherein the inputted output parameter is represented as the first vector and each output parameter stored in the storage is represented as a respective second vector.

14. A program product stored on a non-transitory computer storage medium that causes a computer to function as a function search supporting system, the computer including a storage that stores, in association with each of at least one second function, a history of at least one known output parameter provided by the at least one second function, the program causing the computer to function as:
an input module for receiving an expected output parameter expected as an output from a first function being searched;
a calculating section for calculating first indexes respectively indicating proximity of the expected output parameter to each known output parameter stored in the storage, and summing calculated first indexes for each of the at least one second function; and
an output section for outputting a selected second function from among the at least one second function, the selected second function having a sum of first indexes larger than a predetermined value,
wherein proximity is a measure of the difference in length between a first vector and a second vector, wherein the inputted output parameter received from the input module is represented as the first vector and each output parameter stored in the storage is represented as a respective second vector.

* * * * *